United States Patent
Smith

(10) Patent No.: US 8,858,382 B2
(45) Date of Patent: Oct. 14, 2014

(54) PIN RETAINER

(71) Applicant: Romax Technology Limited, Nottingham (GB)

(72) Inventor: Richard Smith, Nottingham (GB)

(73) Assignee: Romax Technology Limited, Nottingham (GB)

(*) Notice: Subject to any disclaimer, the term of this patent is extended or adjusted under 35 U.S.C. 154(b) by 0 days.

(21) Appl. No.: 13/792,264

(22) Filed: Mar. 11, 2013

(65) Prior Publication Data
US 2013/0237370 A1    Sep. 12, 2013

(30) Foreign Application Priority Data

Mar. 10, 2012   (GB) .................................. 1204248.7

(51) Int. Cl.
| | |
|---|---|
| *F16H 57/04* | (2010.01) |
| *F03D 11/00* | (2006.01) |
| *F16C 25/06* | (2006.01) |
| *F16C 35/063* | (2006.01) |
| *F16C 39/04* | (2006.01) |
| *F03D 1/00* | (2006.01) |
| *F03D 11/02* | (2006.01) |
| *F16H 57/08* | (2006.01) |
| *F16H 57/022* | (2012.01) |

(52) U.S. Cl.
CPC ........... *F16H 57/0471* (2013.01); *Y02E 10/722* (2013.01); *F16H 2057/085* (2013.01); *F03D 11/0008* (2013.01); *F16H 57/082* (2013.01); *F16C 25/06* (2013.01); *F05B 2240/50* (2013.01); *F16C 35/063* (2013.01); *F16C 39/04* (2013.01); *F03D 1/003* (2013.01); *F16H 2057/0221* (2013.01); *F03D 11/02* (2013.01); *F05B 2260/40311* (2013.01)
USPC .......................................... 475/160; 475/331

(58) Field of Classification Search
USPC ................................. 475/159, 160, 331, 348
See application file for complete search history.

(56) References Cited

U.S. PATENT DOCUMENTS 2,688,263 A * 9/1954 Rockwell ....................... 475/338
3,686,978 A * 8/1972 Knoblach et al. ............. 475/296
(Continued)

FOREIGN PATENT DOCUMENTS

| EP | 19922829 A1 | 11/2008 |
|---|---|---|
| GB | 2036252 A | 6/1980 |
| GB | 2111136 A | 6/1983 |

OTHER PUBLICATIONS

Combined Search & Examination Report, UK Intellectual Property Office, Aug. 20, 2013.

*Primary Examiner* — Justin Holmes

(57) ABSTRACT

A gear arrangement for a planetary gearbox includes a planet carrier, a planet pin, a planet gear, bearing means located between the planet pin and the planet gear, the bearing means including a bearing ring, a retainer secured to the planet carrier by one or more bolts, and one or more shims located between the retainer and the planet pin. The planet pin is hollow and is in fluid communication with an inside surface of the bearing ring and with an inlet. This means that a fluid forced via the inlet and the hollow planet pin applies a radial force to the bearing ring, reducing the contact friction between the bearing ring and the planet pin and allowing an axial position of the planet pin to be adjusted to provide a correct preloading to the bearing means. This means that the bearing can be pre-set, in-situ using hydraulic actuator and oil injection.

11 Claims, 3 Drawing Sheets

(56) References Cited

U.S. PATENT DOCUMENTS

| | | |
|---|---|---|
| 3,698,777 A | 10/1972 | McCoy |
| 3,943,780 A * | 3/1976 | Klaue ............................ 475/317 |
| 4,158,972 A * | 6/1979 | Chamberlain ................ 475/337 |
| 4,270,412 A * | 6/1981 | Beijer et al. ................... 475/331 |
| 6,770,007 B2 * | 8/2004 | Fox ................................ 475/348 |
| 2011/0037269 A1 * | 2/2011 | Poon et al. ....................... 290/55 |
| 2011/0140448 A1 * | 6/2011 | Takeuchi et al. ................ 290/55 |

* cited by examiner

PIN RETAINER

CROSS-REFERENCE TO RELATED APPLICATIONS

This application claims the benefit of U.K. Patent Application No. GB1204248.7 filed Mar. 10, 2012.

BACKGROUND OF THE INVENTION

The present invention is related to planetary gear arrangements, in particular to planet carriers, and in particular to an arrangement permitting an axial position of a planet pin to be adjusted to provide a correct preloading to a planet gear bearing.

BRIEF SUMMARY OF THE INVENTION

According to a first embodiment of the present invention, a gear arrangement for a planetary gearbox includes a planet carrier, a planet pin, a planet gear, bearing means located between the planet pin and the planet gear, the bearing means including a bearing ring, a retainer secured to the planet carrier by one or more bolts, and one or more shims located between the retainer and the planet pin. The planet pin is hollow and is in fluid communication with an inside surface of the bearing ring and with an inlet. This means that a fluid forced via the inlet and the hollow planet pin applies a radial force to the bearing ring, reducing the contact friction between the bearing ring and the planet pin and allowing an axial position of the planet pin to be adjusted to provide a correct preloading to the bearing means. This means that the bearing can be pre-set, in-situ using hydraulic actuator and oil injection. When the bearing means is worn through use, an axial position of the planet pin may be re-adjusted to provide a correct preloading to the bearing means. A number and thickness of the one or more spacers is selected to lock the axial position of the bearing means having the correct preload.

According to a further aspect, the present invention includes a gearbox having the gear arrangement described in the previous paragraphs, the gearbox further including a front housing having an inspection cover. The position of the inspection cover is configured to be removed to allow access to the retainer. This means that a fluid forced via the inlet and the hollow planet pin applies a radial force to the bearing ring, reducing the contact friction between the bearing ring and the planet pin and allowing an axial position of the planet pin to be readjusted to provide a correct preloading to the bearing means. A number and thickness of the one or more spacers is selected to lock the axial position of the bearing means having the correct preload.

According to a further aspect, the present invention includes a method for adjusting a preload of bearing arrangement of a gear arrangement for a planetary gearbox, the gear arrangement comprising a planet carrier, a planet pin, a planet gear, bearing means located between the planet pin and the planet gear, the bearing means including a bearing ring, a retainer secured to the planet carrier by one or more bolts, and one or more shims located between the retainer and the planet pin; in which the planet pin is hollow and is in fluid communication with an inside surface of the bearing ring and with an inlet; the method comprising the steps of: removing the bolts and the one or more shims; connecting a hydraulic actuator to the inlet; forcing fluid via the inlet and the hollow planet pin and applying a radial force to the bearing ring, reducing the contact friction between the bearing ring and the planet pin; adjusting an axial position of the planet pin to provide a correct preload to the bearing means; and securing the bolts and the one or more shims. When the bearing means is worn through use, the step of adjusting an axial position of the planet pin comprises readjusting an axial position to provide a correct preloading to the bearing means. The method may include the step of: selecting a number and thickness of the one or more spacers to lock the axial position of the bearing means having the correct preload.

DETAILED DESCRIPTION OF THE INVENTION

Figure 1:
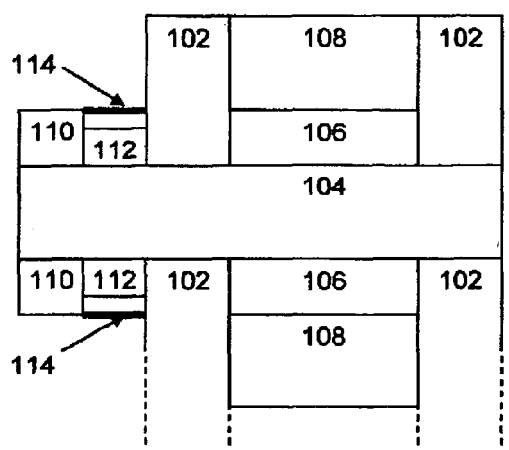
FIG. 1 shows a representation of a gear arrangement.

FIG. 1 shows a planetary gear 100 having a planet carrier 102, a planet pin 104, bearing means 106 and a planet gear 108. Planet gear arrangement 100 is of conventional design; planet pin 104 installed on planet carrier 102 and having bearing means 106 supporting planet gear 108.

Planet pin 104 is held in place by retainer means 110, which references planet pin 104 and attaches to planet carrier 102. For example, retainer means 110 can reference planet pin 104 via a screw arrangement on retainer means 110 and planet pin 104; retainer pin can be fixed to planet carrier 102 via bolts 114. The axial position of planet pin 104 in relation to planet carrier 102 and bearing means 106 is determined by spacer means 112 located between retainer means 110 and planet carrier 102.

The axial position of planet pin 104 preloads bearing means 106, and the correct preload is determined by an axial thickness of spacer means 112. Spacer means 112 is typically one or more shims which are positioned between retainer means 110 and planet carrier to ensure correct preloading of bearing means 106.

Spacer means 112 is preselected to have an axial length to correctly preload bearing means 106.

During initial installation of the planet pin, conventional low-temperature fitting is utilised.

Figure 2:
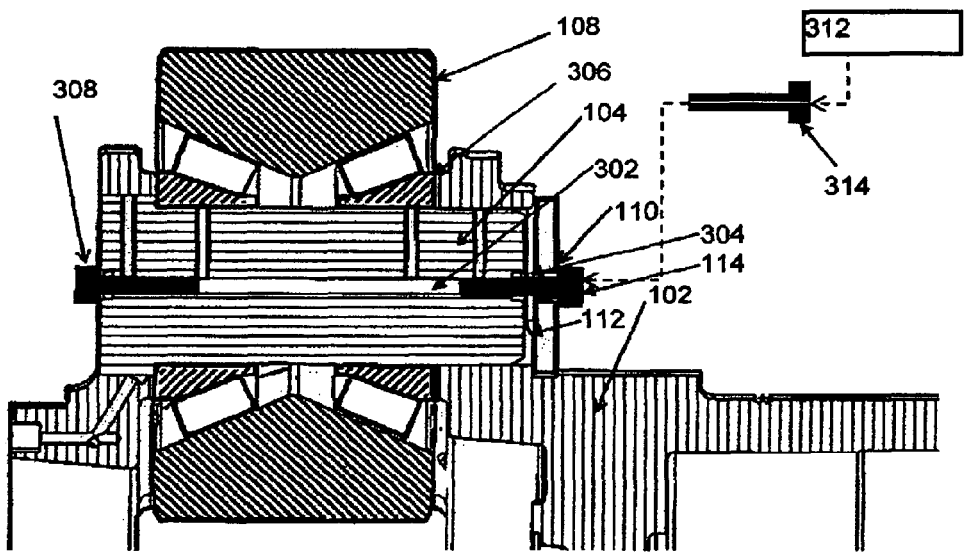
FIG. 2 shows a cross-sectional view of a gear arrangement.

Referring now to FIG. 2, planet pin 104 is hollow and is in fluid communication via a conduit 302 with an inside surface of bearing ring 306. Planet pin 104 comprises an inlet 304 at one end. One or more shims 112 are located between retaining cap 110 and planet pin 104 and are clamped between retaining cap 110 and planet pin 104 by a bolt 114 engaging inlet 304. The number of shims 112 can be increased or decreased to adjust the bearing ring position by mechanical means. In this way, the number of shims 112 that are present can be used to adjust the preload by adjusting the clearance between retaining cap 110 and planet pin 104.

For final fitting, bolt 114 is removed from inlet 304 and a hydraulic actuator 312 is connected (as indicated by dashed lines in FIG. 2) to inlet 304 via a hollow bolt 314 with oil injection fitting, and oil injection is used to adjust the position of planet pin 104, and thus the position of bearing 106. As fluid is pumped into inlet 304 it is forced along an annular groove between bearing ring 306 and planet pin 104 and applies a radial force to bearing ring 306, thereby reducing contact friction between bearing ring 306 and the planet pin 104. This can be used to adjust the location of bearing ring 306 and hence needs only low forces to axially move bearing ring 306.

Planet gear 108 can be rotated during this operation to ensure correct pre-load, which at this stage is determined by hydraulic pressure. Once planet pin 104 bearing means 106 are in position, the oil injection is removed, the hydraulic pressure released and the securing washer 110 and bolt 114 fitted. Shim washers 112 are used here between the end of planet pin 104 and the securing washer 110.

Figure 3:
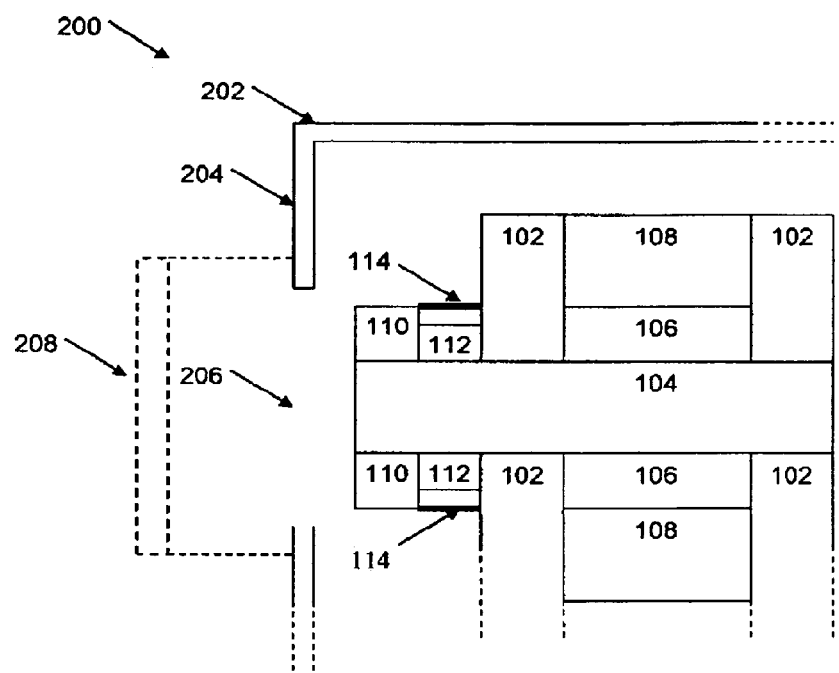
FIG. 3 shows a representation of a gearbox.

Referring now to FIG. 3, part of a gearbox 200 having planetary gear arrangement 100 and a housing 202 is shown. Housing 202 has front surface 204 having an aperture 206 arranged radially in one sector of a generally circular front surface 204. Aperture 206 is arranged so as to align with retainer means 110. When bearing means 106 wears, the preload applied by planet pin 104 becomes incorrect. Retainer means 110 is disconnected from planet carrier 102 and removed from planet pin 104, allowing spacer means 112 to be likewise removed. The axial position of planet pin 104 can be readjusted to provide the correct preloading to bearing means 106, a replacement spacer means 112 of appropriate axial dimension installed, and retainer means reaffixed to planet carrier 102. An inspection cover 208 can then be placed over aperture 206.

For in-service maintenance re-seating and adjustment of bearing 106, an inspection cover in front housing 202 is removed, and planet carrier 102 is rotated until it is aligned. The hydraulic actuator 304 and the hollow bolt 314 with oil injection fitting is fitted (as indicated by dashed-lines in FIG. 2), and oil injection is used to adjust the position of planet pin 104, and thus the position of bearing 106. Again, pre-load is determined by hydraulic pressure. This equipment can be temporarily removed to rotate planet carrier 103 and thus bearing 106. Once planet pin 104 and bearing 106 are in position, the oil injection is removed, the hydraulic pressure released and securing washer 110 and bolt 114 fitted. Shim washers 112 are used here between the end of planet pin 104 and securing washer 110.

Advantages of this invention include:

Lubrication for the bearings can come from using a drilled planet pin etc;

Minimal part count;

No specific machining of any parts;

Bearing can be pre-set, in-situ using hydraulic actuator and oil injection;

Providing front cover access hole is designed correctly, hydraulic actuator & oil injection can be fitted in-turbine, and the bearing re-seated during their life.;

Being able to both set the clearance during first assembly . . . and adjust it in service.

Figure 4:
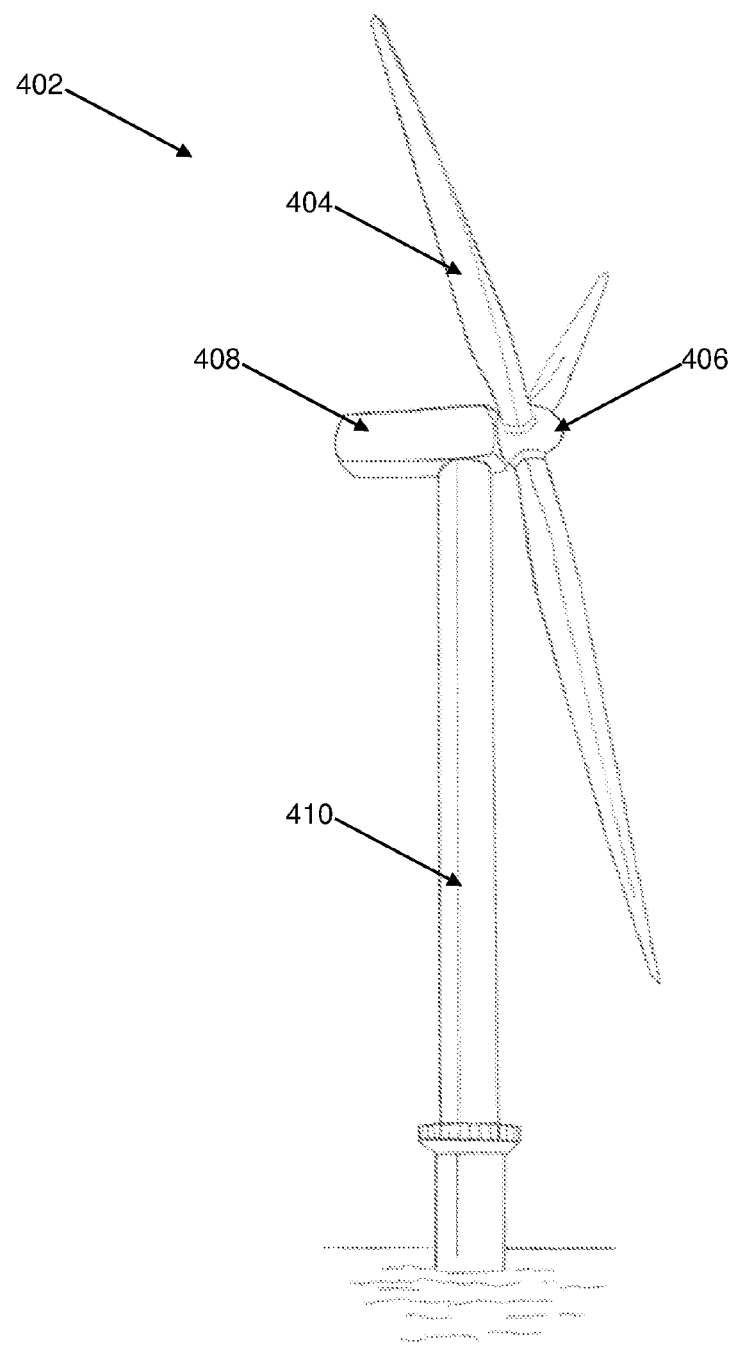
FIG. 4 shows an external view of an offshore wind turbine.

FIG. 4 is a perspective view of an example of a wind turbine. Although an offshore wind turbine is shown, it should be noted that the description below may be applicable to other types of wind turbines. The wind turbine 402 includes rotor blades 404 mounted to a hub 406, which is supported by a nacelle 408 on a tower 410. Wind causes the rotor blades 404 and hub 106 to rotate about a main axis. This rotational energy is delivered to a gearbox housed within the nacelle 408.

The invention claimed is:

1. A gear arrangement for a planetary gearbox, said gear arrangement comprising a planet carrier, a planet pin, a planet gear, bearing means located between said planet pin and said planet gear, said bearing means including a bearing ring, and one or more shims located between said retainer and said planet pin; said planet pin is hollow and is in fluid communication with an inside surface of said bearing ring, said planet pin comprising an inlet at one end;
in which said retainer is secured to said planet carrier by a bolt engaging said inlet;
wherein a fluid forced via said inlet and said hollow planet pin applies a radial force to said bearing ring, reducing said contact friction between said bearing ring and said planet pin and allowing an axial position of said planet pin to be adjusted to provide a correct preloading to said bearing means.

2. The gear arrangement of claim 1, in which said bearing means is worn through use, an axial position of said planet pin is re-adjusted to provide a correct preloading to said bearing means.

3. The gear arrangement of claim 1, in which a number and thickness of said one or more spacers is selected to lock said axial position of said bearing means having said correct preload.

4. A gearbox comprising the gear arrangement of claim 1, said gearbox further comprising:
a front housing having an inspection cover;
a position of said inspection cover configured to be removed to allow access to said retainer;
wherein a fluid forced via said inlet and said hollow planet pin applies a radial force to said bearing ring, reducing said contact friction between said bearing ring and said planet pin and allowing an axial position of said planet pin to be readjusted to provide a correct preloading to said bearing means.

5. The gearbox of claim 4, in which a number and thickness of said one or more spacers is selected to lock said axial position of said bearing means having said correct preload.

6. A wind turbine comprising the gearbox of claim 4.

7. A wind turbine comprising the gear arrangement of claim 1.

8. The gear arrangement of claim 1, in which said bolt engaging said inlet is hollow, and in which said fluid is forced via said hollow bolt engaging said inlet.

9. A method for adjusting a preload of a bearing arrangement of a gear arrangement for a planetary gearbox, said gear arrangement comprising a planet carrier, a planet pin, a planet gear, bearing means located between said planet pin and said planet gear, said bearing means including a bearing ring, a retainer secured to said planet carrier by one or more bolts, and one or more shims located between said retainer and said planet pin; in which said planet pin is hollow and is in fluid communication with an inside surface of said bearing ring and with an inlet; said method comprising the steps of:
removing said bolts and said one or more shims;
connecting a hydraulic actuator to said inlet;
forcing fluid via a hollow bolt engaging said inlet and said hollow planet pin and applying a radial force to said bearing ring, reducing said contact friction between said bearing ring and said planet pin;
adjusting an axial position of said planet pin to provide a correct preload to said bearing means; and
securing said bolts and said one or more shims.

10. The method of claim 9, in which said bearing means is worn through use, and wherein said step of adjusting an axial position of said planet pin comprises readjusting an axial position to provide a correct preloading to said bearing means.

11. The method of claim 9, including the step of: selecting a number and thickness of said one or more spacers to lock said axial position of said bearing means having said correct preload.

* * * * *